United States Patent [19]

Hasenwinkle et al.

[11] 4,027,769

[45] June 7, 1977

[54] MACHINE FOR CONVEYING SECTOR SHAPED PIECES

[75] Inventors: Earl Dean Hasenwinkle; Frank Wislocker, both of Longview, Wash.

[73] Assignee: Weyerhaeuser Company, Tacoma, Wash.

[22] Filed: Jan. 7, 1976

[21] Appl. No.: 647,031

[52] U.S. Cl. .............................. 198/570; 198/780; 198/782; 214/1 S; 83/156; 144/246 R; 144/246 D

[51] Int. Cl.² ........................................ B65G 37/00

[58] Field of Search .................. 198/127 R, 167, 75, 198/29, 235, 570, 780, 782; 214/1 F, 1 S; 144/246 R, 246 D, 309 L, 314 B, 315 R, 316; 83/156, 89, 102, 102.1, 103, 105–107, 708, 444, 448–450

[56] References Cited

UNITED STATES PATENTS

| | | | |
|---|---|---|---|
| 1,531,367 | 3/1925 | Ahrens | 83/102.1 |
| 3,903,943 | 9/1975 | Hasenwinkle | 144/309 L |

*Primary Examiner*—Evon C. Blunk
*Assistant Examiner*—Joseph E. Valenza

[57] ABSTRACT

A process and machine are disclosed that function to convey a pair of elongated sector shaped pieces where each piece has substantially the same smaller included angle. Upper and lower conveyancing channels are supported on a framework and have a common longitudinally extending adjustable support means whereby sector pairs of varying included smaller angles may be readily oriented and then conveyed. Suitable holding means are provided for constraining each sector piece in its conveyancing channel as they are conveyed longitudinally toward the outfeed end of the machine.

12 Claims, 7 Drawing Figures

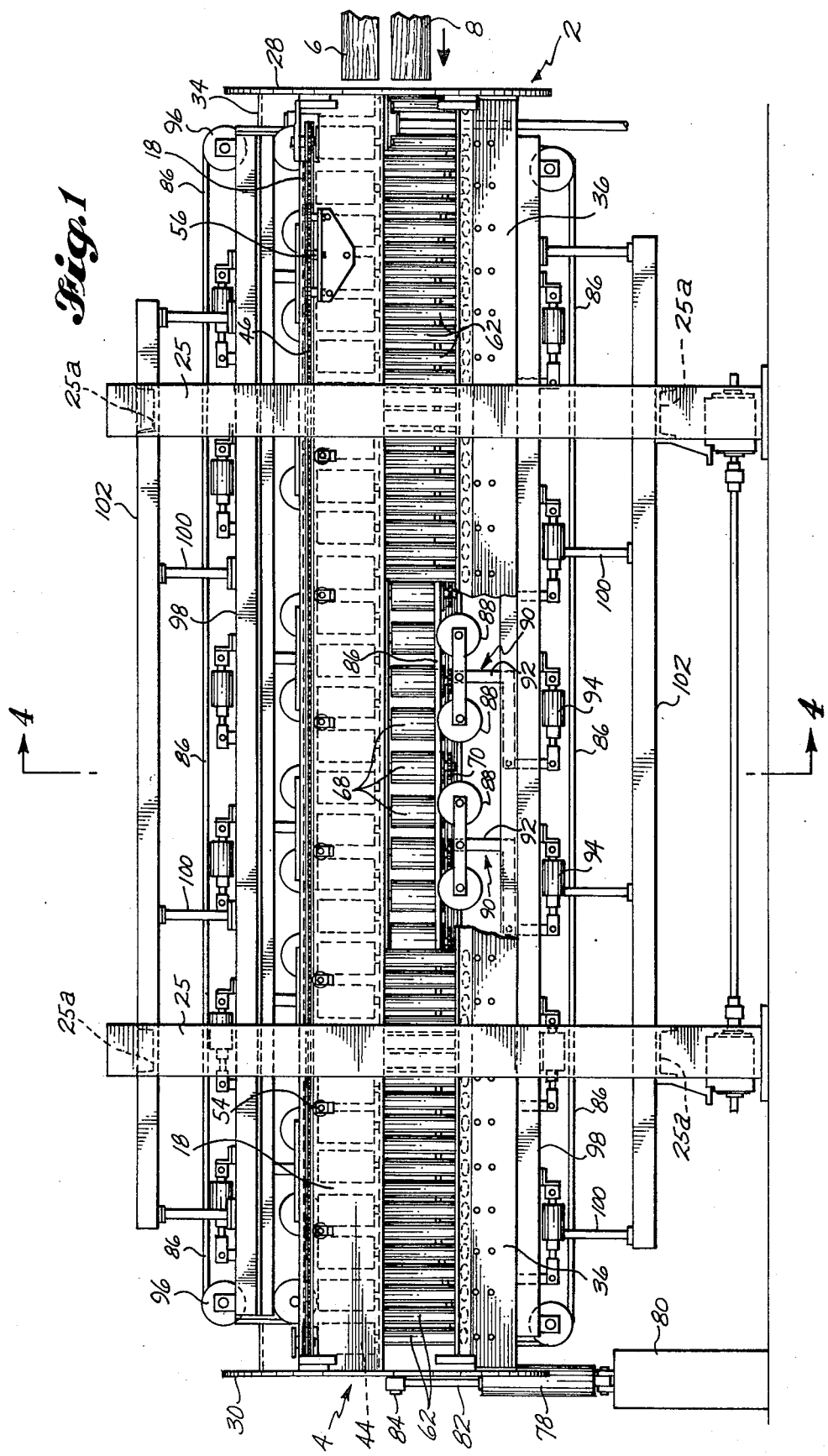

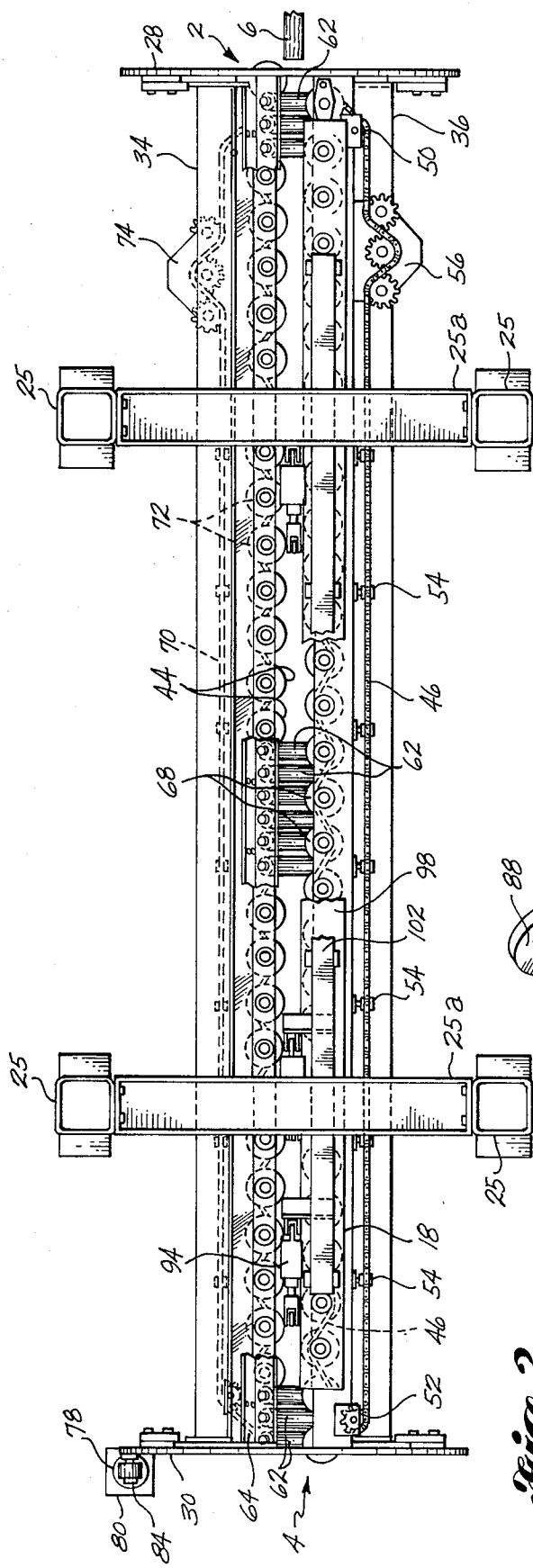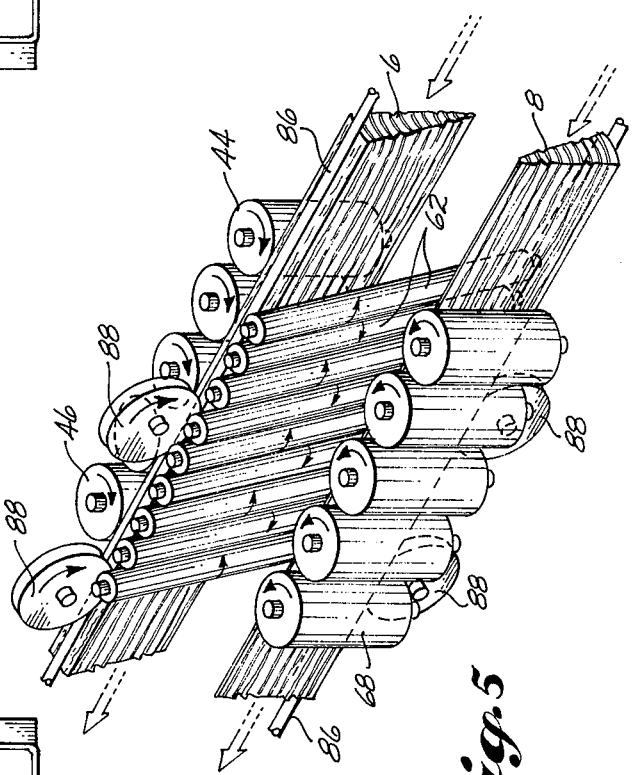

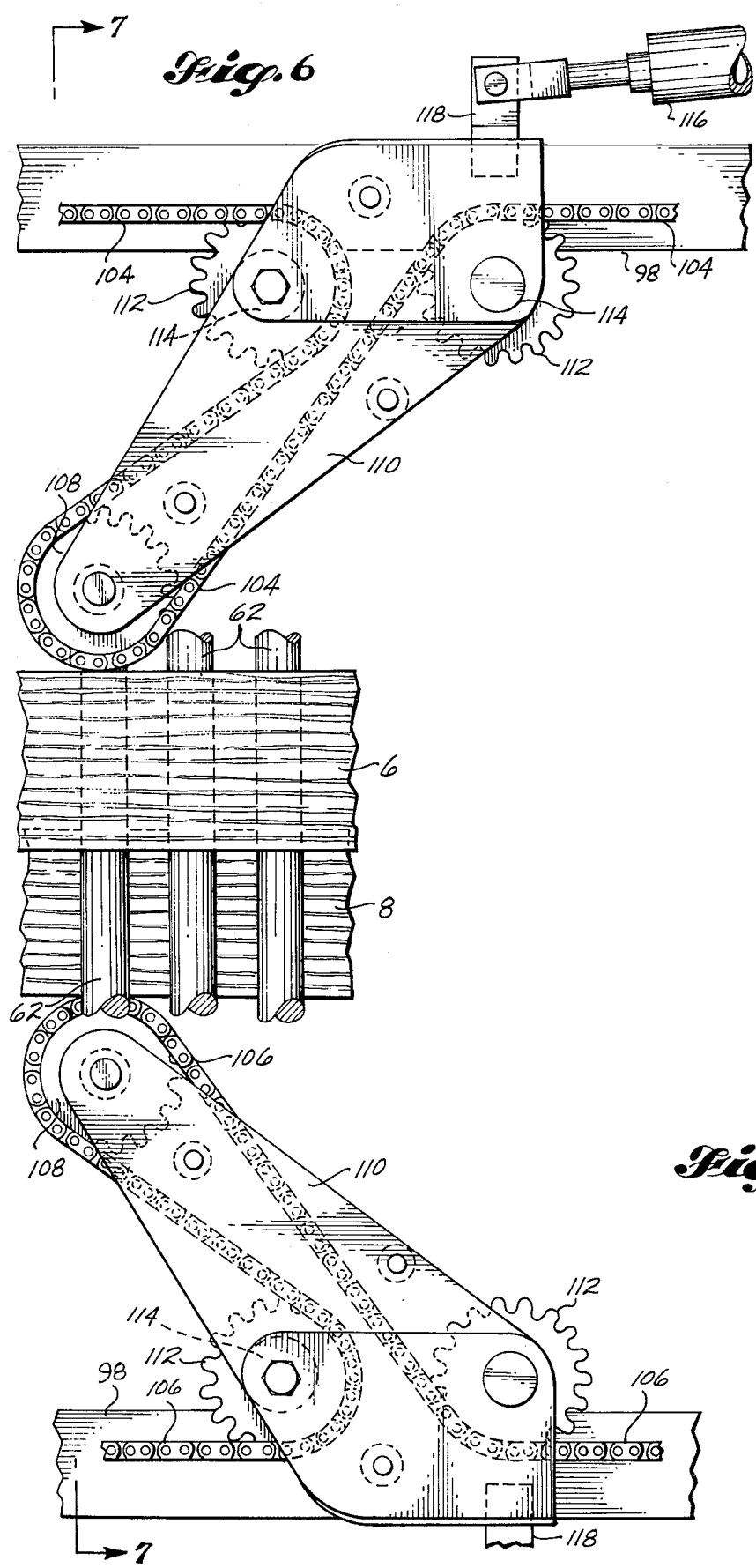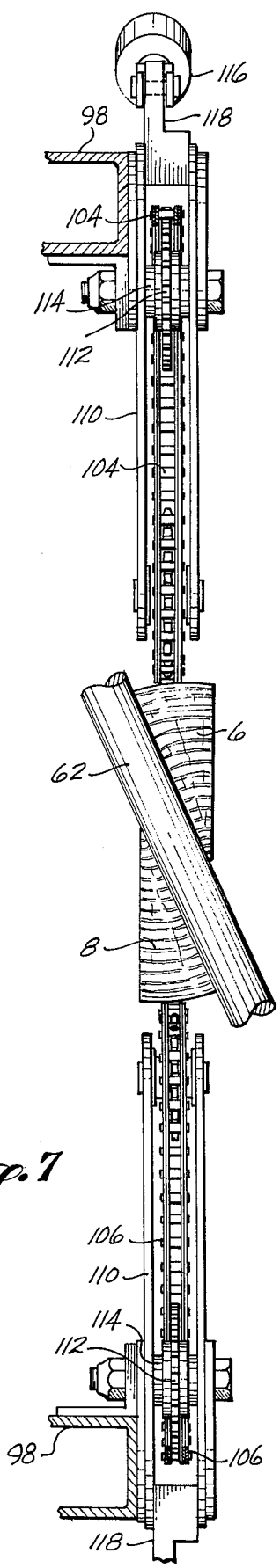

MACHINE FOR CONVEYING SECTOR SHAPED PIECES

BACKGROUND OF THE INVENTION

1. Field of the Invention

This invention relates generally to the lumber handling art and more particularly to a method and apparatus for longitudinally conveying a pair of sector shaped pieces of wood.

2. Description of the Prior Art

The lumber manufacturing process has traditionally taken cylindrically shaped logs and broken them down into generally elongated rectangular pieces of lumber. Longitudinal sawing of logs into such shapes has been taking place for centuries, however, now with the supply of larger old growth logs being rapidly depleted it has become necessary to convert ever increasing numbers of smaller logs into lumber products. Smaller logs, as is well known, yield considerably less lumber on a volumetric basis and several new methods for increasing yields of smaller logs have been devised. Not only is the problem with generally lower yields important, it is also apparent that the flexibility in supplying needed products over the size range now available is limited. For example, with traditional longitudinal rectangular sawing it is impossible to cut a typical 2×10 piece of solid lumber from an eight inch diameter log.

Among various alternative lumber producing processes that would impact on the above-mentioned problems is one whose logs are cut radially into a plurality of sector shaped pieces with two appropriately sized sectors then being rejoined such that the thin edge of one is approximately adjacent the thick edge of the other. The resulting pair can then be machined into usable shapes as lumber products or for edge gluing into wider widths. This process is fully disclosed in the issued U.S. Pat. No. 3,961,654 entitled 'Log Cutting and Rejoining Process' and which is assigned to the assignee of the present invention. Another similar process is disclosed in the issued U.S. Pat. No. 3,903,943, also assigned to the assignee of the present invention. The disclosure in each is incorporated herein by this reference in order to offer one skilled in the art additional information with regard to the background and description of the present invention.

In each of the above-referenced inventive processes, a pair of elongated similarly sized sector shaped pieces can be rejoined along opposed faces in order to form a quadrilateral shape. Throughout the various process steps the sector shaped pieces must be handled and then transported between processing stations. It was determined that after the two sector shaped pieces to be joined had been selected, it would then be desirable to convey them as a pair. One convenient place in the process to begin conveying as pairs is where the sector shaped pieces come from the drying station. By way of explanation, the freshly cut green sector shaped pieces are dryed to a suitable moisture content prior to the bonding step. At this point in the process, or before, the two sectors to be adhesively bonded together are selected. According to the overall process the sectors are selected for size with a given size class normally being processed during a given operating period. The two selected sector shaped pieces are similar in size in that the smaller included angle of each is substantially the same, as will be their widths and lengths. As will be understood when referring to the aforementioned patents the widths of two sectors to be joined may vary, and this should be taken into account in any conveying process and machine. Also, while the included angles of the sector shaped pieces within a pair are similar, the included angle may vary between pairs of sectors. Thus, provision must be made to accommodate variable included angles of given sector pairs.

SUMMARY OF THE INVENTION

Briefly, the present invention is the method of and apparatus for conveying a pair of elongated sector shaped pieces that have substantially the same smaller included angle. The process is comprised of positioning the selected pieces to establish an opposed spatially offset relationship with the two corresponding opposed offset sides having a substantially parallel orientation. The pieces are supported in the established spatial relationship and then conveyed longitudinally over a distance. The apparatus comprises means to carry out the process.

BRIEF DESCRIPTION OF THE DRAWINGS

FIG. 1 is a side elevation view with selected cutaway portions depicting the machine of the present invention.

FIG. 2 is a top plan view also with selected cutaway portions depicting the present invention.

FIG. 5 is a perspective view in schematic form showing the conveying operation.

FIG. 6 is a side elevation view showing the preferred base support means.

FIG. 7 is a cross-sectional view through line 7—7 of FIG. 6.

DESCRIPTION OF THE PREFERRED EMBODIMENT

Figure 3:
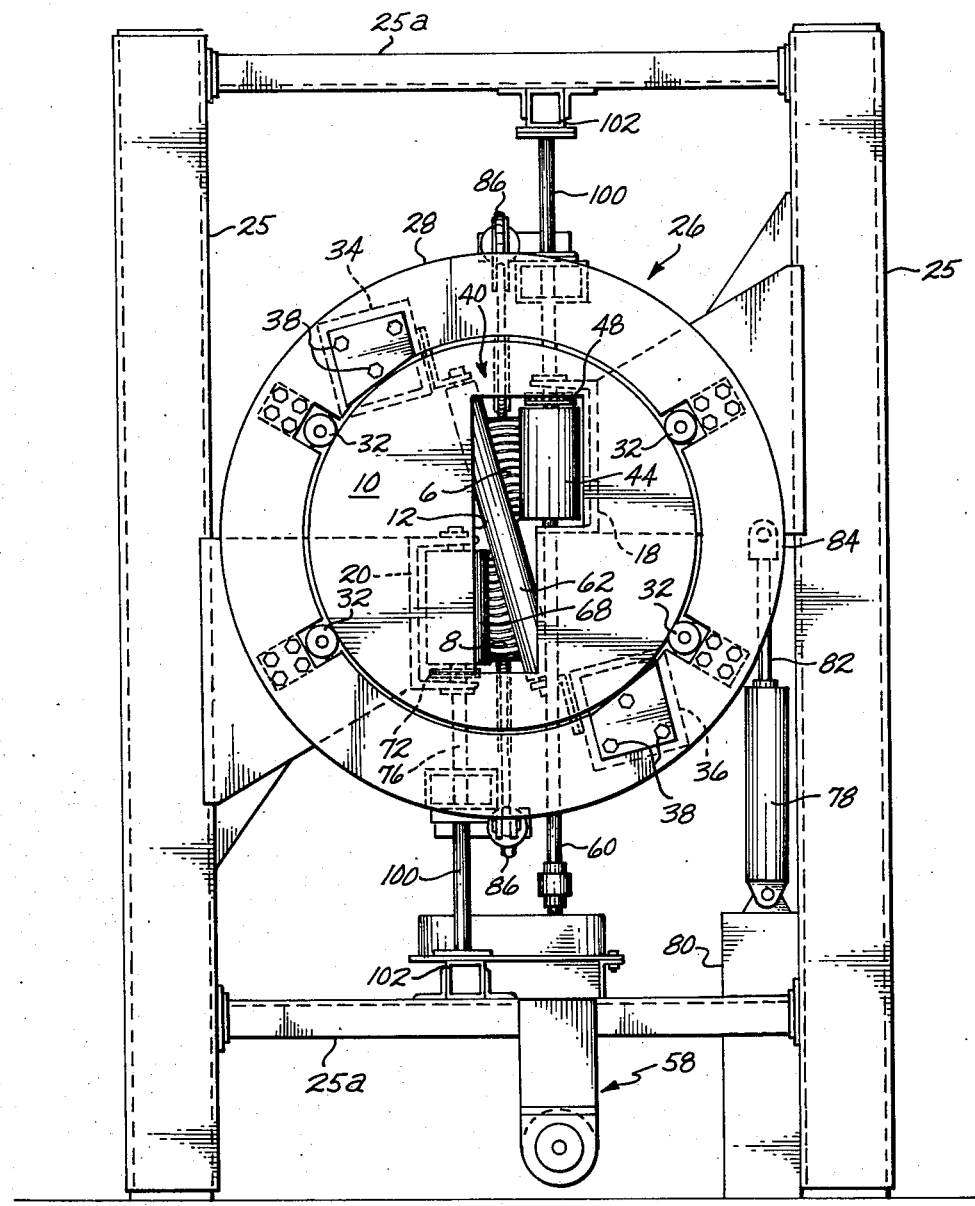
FIG. 3 is an end view of the apparatus showing the infeed end of the machine.

Referring first to FIG. 1, the conveying apparatus of the present invention has an infeed end indicated generally at 2 and an outfeed end generally at 4. The longitudinal distance between infeed end 2 and outfeed end 4 is that distance over which two elongated sector shaped pieces 6, 8 are to be conveyed. As is apparent, the machine is in an in-line relationship over the distance of travel.

Referring to the other figures now in addition to FIG. 1, there is at infeed end 2 a circular spatially fixed substantially vertically oriented ring 10 in which is positioned a cutout portion 12. Cutout portion 12 serves to generally define the conveying path for pieces 6,8. In order to support various operating elements, as will become apparent, another spatially fixed ring 14 is positioned at outfeed end 4 and is longitudinally in line with ring 10. Ring 14 similarly has a cutout portion 16 sized so as to allow sector shaped pieces to pass therethrough as they are conveyed longitudinally past the outfeed end.

Rings 10 and 14 are supported in their stationary inline positions by a pair of longitudinally extending vertically spaced upper and lower channel beams 18, 20. Beams 18, 20 are also spaced apart laterally and have their respective open sections faced toward the conveying path. The rings 10, 14 are securely attached to the ends of beams 18, 20 in a rigid arrangement. Supporting beams 18, 20 in their proper spatial orientation are a plurality of horizontally extending support arms 22, 24 together with other suitable supporting structure to adequately support the weight. Overall vertical and horizontal support is provided by pairs of upstanding closed beams 25 to which are firmly attached the support arms 22, 24 and horizontal beams 25a extending between beams 25.

A rotatable frame, indicated generally at 26, is adapted to rotate about the rings 10 and 14 and more specifically about an axis corresponding to the center line through rings 10 and 14. Rotatable frame 26 is comprised of at least two rotating rings 28, 30 that have roller bearings 32 spaced around their inner periphery so as to be able to rotate around rings 10, 14 by tracking about their respective peripheries. Serving to support rotating rings 28, 30 so they can rotate as a unit are longitudinally extending diagonally spaced support beams 34, 36. Support beams 34, 36 are fixedly attached at each end to a rotating ring through any suitable attaching means 38. The roller bearing 32 are fixedly attached about the inner periphery of each ring 28, 30 in a manner such that the bearings track about the peripheries of rings 10, 14.

Establishing an offset vertically spaced relationship between the two elongated sector shaped pieces are the vertically spaced conveyancing channels; the upper channel being generally indicated at 40 while the lower channel is generally indicated at 42. Serving to provide one of the supporting conveying surfaces along upper conveyancing channel 40 are a plurality of upper driving rolls 44. Driving rolls are longitudinally spaced along the conveying distance and are mounted in the open section of beam 18 so as to be rotatable about vertical axes. They are mounted so as to be parallel in a common longitudinal plane and selected rolls are comprised of a suitable surface material to frictionally drive the juxtaposed face of the sector shaped piece. As will be apparent, the rolls 44 form part of both the means to support and the means to convey the sector shaped piece 6. The means to drive rolls 44 is comprised of an endless chain 46 trained about sprockets 48 mounted on each drive roll, preferably at the top thereof. Chain 46 is supported on its back run by a pair of spaced idler sprockets 50, 52 positioned at the infeed and outfeed ends together with longitudinally spaced chain support stations 54. A chain tensioning device 56 is provided in order to control the proper amount of tension on chain 46 during operation.

Serving to actually drive the rolls 44 is a motor 58 mounted beneath rolls 44 with a drive shaft 60 extending upwardly therefrom and fixed to one roll so as to drive it in a direction to create a conveying surface. Since the one driven roll 44 has chain 46 operatively connected thereto, it will then serve to rotate the other rolls in the same direction by turning their respective sprockets 48.

Figure 4:
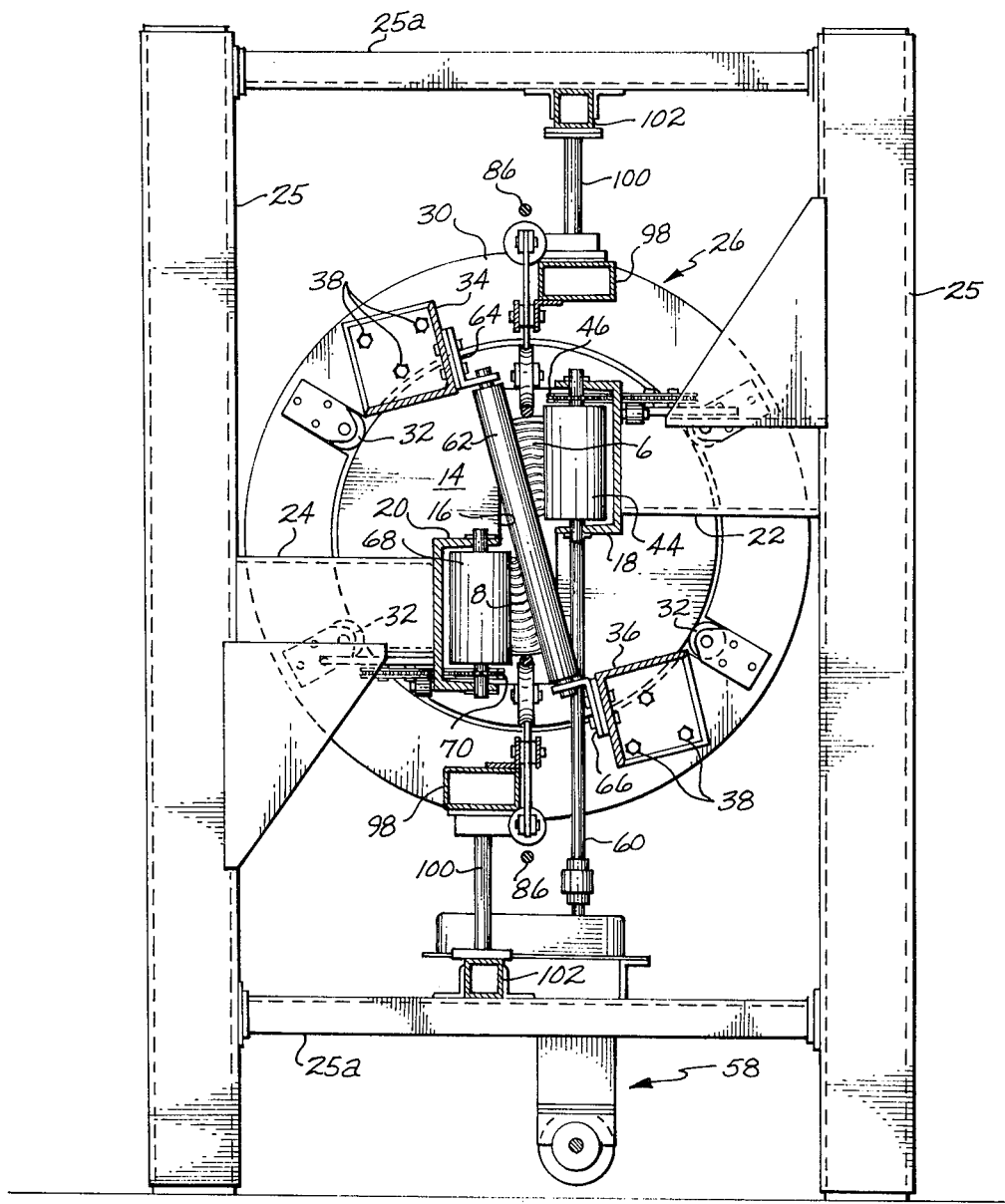
FIG. 4 is a typical cross-sectional view taken through line 4—4 of FIG. 1 and clearly shows the fixed support members with respect to the rotatable support members.

Serving to support the other face of sector shaped piece 6 and to act as a conveying surface therefor are a plurality of longitudinally spaced inclined rolls 62. Rolls 62 are in a laterally offset relationship with respect to each other and selected rolls act to form a common longitudinally extending adjustable plane. Inclined rolls 62 extend between the two spaced beams 34, 36 and are mounted on vertically and laterally spaced angle beams 64, 66 which are fixed to beams 34, 36. As may be seen when referring to the cross-sectional view of FIG. 4, rolls 62 are mounted in the offset orientation along the laterally extending inclined portions of angle beams 64, 66. Rolls 62 are mounted in bearings so as to freely rotate when a turning force is applied. It will be recognized that the downwardly directed apex angle formed between rolls 44 and adjustable rolls 62 is established to accept the smaller included angles of sector shaped pieces 6.

Since offset inclined adjustable rolls 62 extend downwardly past the apex of upper conveyancing channel 40, selected ones serve to establish one supporting and conveying surface for the bottom conveyancing channel 42 while a bank of lower driving rolls 68 are provided to establish the other supporting and conveying surface. Rolls 68 are essentially identical in structure to upper rolls 44 with the exception that they are mounted longitudinally along lower channel beam 20. Similarly to upper rolls 44, the lower driving rolls 68 are chain driven by way of an endless drive chain 70 trained about a plurality of sprockets 72 positioned towards the bottom of each roll's rotatable shaft. Also similar is the provision of a known chain tensioning device 74 together with means to support drive chain 70 on its back run. A single lower roll 68 is powered by motor 58 through an upwardly extending drive shaft 76 similar to drive shaft 60 but laterally spaced therefrom. The sprocket 72 connected to the powered roll then acts to drive chain 70 to rotate the other rolls.

As will now be appreciated, the lower portions of the selected offset inclined rolls 62 together with lower rolls 68 form the upwardly directed apex of the lower conveyancing channel 42. Since rolls 62 are mounted on beams 34, 36 that rotate as a unit on rotatable frame 26, they may be rotated to simultaneously adjust the included angle between the respective upper and lower driving rolls and the respective portions of the inclined offset rolls. Serving to rotate frame 26 is a suitably placed means to rotate frame 26 such as a multi-position actuating cylinder 78. The cylinder 78 is mounted on a base 80 and extends upwardly therefrom with the positioning end of ram 82 being pinned at point 84 on rotating ring 30. Of course, actuating cylinder 78 could be attached to the other ring 28 or at any other suitable point on frame 26 in order to cause rotation. When cylinder 78 is actuated to set the angle between supporting surfaces for the upper and lower conveyancing channels 40, 42 it will rotate frame 26 to a new position. Cylinder 78 provides a preselected number of sets (angles between supporting surfaces) based on the number of smaller included angles of the sector shaped pieces to be conveyed. For example, if sector angles vary with four selected sizes from 45° down to 18°, then cylinder 78 will be extendible and settable accordingly. Once set, means are provided to hold frame 26 in the proper position during a particular conveying sequence, that is, one where the two sector shaped pieces 6, 8 are similar in size. The spacing between the sector shaped pieces, as established by the size of rolls 62, is selected in order to minimize the positional change of the apeces of any sector to be conveyed when the rolls 62 are set to a corresponding new position.

As is clearly apparent, at least the bottom sector shaped piece 8 must have vertical support on its lower base. Without support means gravity would cause the piece to fall from lower conveyancing channel 42. One means to support the lower piece 8 is depicted in FIGS. 1–5 while an alternate and more preferred means is depicted in FIGS. 6 and 7. In addition to the support means for lower conveyancing channel 42, suitable flexibly biased hold down means may be provided along the top side of upper conveyancing channel 40 to urge the sector shaped piece 6 into the apex of conveyancing channel 40.

Support in the embodiment of FIGS. 1–5 is provided on lower piece 8 by an endless belt 86 supported in turn by a plurality of pivotal paired roller wheels 88 that have an upwardly directed flexible biasing force exerted thereon through attachment mechanisms each generally indicated at 90. The attachment mechanisms 90 are comprised of pivoting arms 92 with a horizontally directed actuating cylinder 94 attached thereto for flexibly biasing the respective attachment mechanism 90 and hence transmitting the upward force to roller wheels 88. Endless belt 86 is in turn urged upwardly and transmits the upwardly directed supporting force to lower piece 8. This arrangement allows sector shaped pieces of varying width to be accommodated within the conveying channels. Suitably spaced idler wheels 96 serve to track endless belt 86 in its return travel path. Serving to support the paired roller wheels 88 and their respective attachment mechanisms 90 is a longitudinally extending horizontal box beam 98 which is in turn supported spatially by a plurality of longitudinally spaced vertical columns 100 fixed to another box beam 102 extending longitudinally between cross beams 25a.

The means to hold the sector shaped piece 6 in conveyancing channel 40 is essentially the same as the means supporting piece 8 and like reference numbers represent like elements. A difference is, however, that the upper roller wheels and endless belt are suspended from an overhead framework which is attached to the upper longitudinally extending box beam 102 which in turn is spatially supported by overhead cross beams 25a.

An alternate preferred embodiment for the endless belts is an endless drive chain arrangement. An upper and lower base drive chain, 104 and 106 respectively, are provided to contact the respective base of each sector shaped piece as selected longitudinally spaced points. The drive chains 104, 106 at the contact points are supported on free rotating sprockets 108 that are mounted at the ends of vertically extending pivotal supporting frames 110. Chains 104, 106 are directed to and away from sprockets 108 by pairs of spaced idler sprockets 112. Serving to pivot supporting frames 110 about pivotal connection points 114 are actuating cylinders 116 attached to lever arms 118. Actuating cylinders 116 act to exert releasable vertical forces at the chain contact points and thereby support the urge bottom piece 8 into conveyancing channel 42 while urging top piece 6 into conveyancing channel 40 more positively. Since sprockets 108 are movable vertically, sector shaped pieces of varying widths can be accommodated. The cross-sectional view in FIG. 7 shows additional detail of the connection points 114 and of the framework on which the drive chains are spatially supported. Suitable means (not shown) are provided to drive the chains 104, 106 and could include motor driven drive sprockets appropriately positioned to engage the drive chains. The speed of drive chains 104, 106 is equal to the peripheral speed of rolls 44 and 68.

The operation and sequencing of the invention will now be described. With respect to the process, a pair of similarly sized sector shaped pieces are selected that have the same smaller included angle between sides. The widths may vary and the bases can have rough surfaces. The basic function of the process and machine is to convey the selected pair over a longitudinal distance in a certain orientation from infeed end 2 to the outfeed end 4.

Prior to conveying the pieces in a pair, but after selecting them, the size of each conveyancing channel will be adjusted in order to accept the particular size. An appropriate sensing means can determine dimensions of the pieces and generate information with respect to angle size and sector width although the width variation can be accepted by the flexible biasing structure provided. Upon determining the size of the included angle, cylinder 78 is actuated to rotate frame 26 and consequently the bank of inclined rolls 62 in order to establish the proper size for upper and lower conveyancing channels 40, 42. Since the respective upper and lower banks of driving rolls 44, 68 remain stationary, changing the angle of rolls 62 with respect thereto effectively adjusts the conveyancing channel size. An adjustment for angle size is made each time the included angle within a pair of sector shaped pieces changes.

Having selected the pair to be conveyed and set the angle for rolls 62, the sector shaped pieces are then spatially positioned at infeed end 2 for feeding, substantially simultaneously, into the upper and lower conveyancing channels. It is apparent that the spatial relationship between pieces of a given pair is such that they are spaced apart in a reversed offset manner with the adjacent offset faces being in a parallel orientation. The structure of the machine then serves to establish and support the conveyancing channels such that the spatial relationship is maintained throughout the conveyed distance.

Upon establishing the spatial relationship, the pieces are then moved into the infeed ends of the conveyancing channels. The driving rolls are actuated to establish part of the necessary conveying forces. In addition, the upper and lower base drive chains are actuated to establish the vertical support means for each sector shaped piece. Upon entering the infeed end, the bases of each piece will contact the respective base drive chain, each independently adjusting its vertical position to accommodate the particular width of the sector shaped piece. The pair of sector shaped pieces will then be conveyed from the infeed end longitudinally toward the outfeed end. At the outfeed end the pieces of the pair can be accepted by any suitable handling means.

While a detailed description has been given of the principal embodiment, it is understood that changes and modifications may be made without departing from the spirit of the invention. All such modifications are intended to be included within the scope of the appended claims.

What is claimed is:

1. An apparatus for supporting and longitudinally conveying a pair of elongated similarly sized sector-shaped pieces in an orientation where said pieces are spatially offset from one another such that an apex of one piece is directed toward an apex of the other with the angles of said apexes being substantially similar and with at least one face of each piece being substantially parallel with the corresponding other face comprising:

a first V-shaped conveyancing channel comprised in part of means to support and engage for conveying at least one face of one of said pieces and in part of means to at least support said other face of said one piece, and further in part of means to support a base of the piece, and a second V-shaped conveyancing channel comprised in part of means to support and engage for conveying at least one face of the other of said pieces and in part of said means to at least support said other face of said other piece.

2. The apparatus as in claim 1 in which said means to at least support said other faces of said pieces is adjustable so as to vary the included angle between each said support means and said means to support and engage for conveying.

3. The apparatus as in claim 1 in which said means to at least support said other faces of said pieces is comprised of a plurality of longitudinally and laterally spaced inclined rolls.

4. The apparatus as in claim 3 in which said inclined rolls are mounted on a rotatable frame for simultaneously adjusting the included angles of said first and second conveying channels.

5. The apparatus as in claim 1 further including means associated with said second conveyancing channel for exerting an inwardly directed resultant force on the base of the piece within said second conveyancing channel.

6. The apparatus as in claim 5 further including means associated with said first conveyancing channel for exerting an inwardly directed resultant force on the base of the piece within said first conveyancing channel.

7. The apparatus as in claim 1 in which said means to support and engage for conveying at least one face of said pieces are comprised of a first and second plurality of longitudinally spaced driving rolls extending the length of said first and second V-shaped conveyancing channels respectively.

8. The apparatus as in claim 7 in which selected ones of said driving rolls have a surface material applied thereto to enhance the frictional driving engagement between said rolls and the juxtaposed face of said piece.

9. The apparatus as in claim 7 in which said rolls are driven by endless chains trained about sprockets mounted in a common plane on each roll.

10. The apparatus as in claim 4 in which said rotatable frame is caused to rotate about its longitudinal axis by a multi-position actuating cylinder.

11. The apparatus as in claim 10 further including means to hold said frame in a set position during a conveying sequence.

12. The apparatus as in claim 5 in which said resulant force is generated by a plurality of biased rolling contact points along the base of said piece.

* * * * *